United States Patent [19]
Robinson et al.

[11] Patent Number: 5,559,802
[45] Date of Patent: Sep. 24, 1996

[54] COMMUNICATION SYSTEMS

[75] Inventors: David C. Robinson, Thatcham; Nicholas W. Emery, Wokingham, both of United Kingdom

[73] Assignee: Digital Equipment Corporation, Maynard, Mass.

[21] Appl. No.: 178,188

[22] Filed: Jan. 6, 1994

[30] Foreign Application Priority Data

Jan. 7, 1993 [GB] United Kingdom ............. 9300222

[51] Int. Cl.⁶ .................................................. H04J 3/24
[52] U.S. Cl. .................................................. 370/94.1
[58] Field of Search ............... 370/79, 94.1, 58.1, 370/110.1, 60, 85.13, 94.2, 94.3, 60.1, 100.1, 58.2, 58.3; 395/375, 425, 842, 850, 427, 429, 431, 821, 825, 831

[56] References Cited

U.S. PATENT DOCUMENTS

| | | | |
|---|---|---|---|
| 4,792,941 | 12/1988 | Yanosy, Jr. et al. | 370/58 |
| 4,930,159 | 5/1990 | Kravitz et al. | 370/94.1 |
| 5,067,104 | 11/1991 | Krishnakumar et al. | 395/375 |
| 5,115,432 | 5/1992 | Haas | 370/94.1 |
| 5,124,984 | 6/1992 | Engel | 370/94.1 |
| 5,142,528 | 8/1992 | Kobayashi et al. | 370/79 |

FOREIGN PATENT DOCUMENTS

0363173A2  4/1990  European Pat. Off. ........ G06F 13/12
WO89/02129  3/1989  WIPO ........................ G06F 15/16

OTHER PUBLICATIONS

"Finishing the Upper Layer(s) of the OSI Reference Model—Part 2 of the ULA Charter,"—Draft—John Day, BBN Communications, 6 Jan. 1992.

*Primary Examiner*—Douglas W. Olms
*Assistant Examiner*—Dang Ton
*Attorney, Agent, or Firm*—Kenneth F. Kozik

[57] ABSTRACT

The invention concerns the upper layers of the OSI 7-layer system interconnection model, and specifically the upper 3 layers (session, presentation, and application). The three layer state tables of the standard system are merged (amalgamated) into a single state table. Merged component state tables 28' are looked up by the message PDU (protocol data unit) in register 11' and the merged state in register 26' and the entries (predicate, actions, and next state combinations) are processed by an entry logic unit 31', a predicate logic unit 32', and a variable list 33'. In merging the state tables, the data phase services of the session and presentation layers have to be merged. The presentation layer service P-ALTER-CONTEXT requires 4 states for each of the supporting session states. The number of states of the merged tables concerned with this is divided by 4 by using a new variable, p-state, which represents the 4 session layer states associated with P-ALTER-CONTEXT. A set of new predicates are used in the state table entries to detect a variety of possible combinations of states of this variable p-state.

6 Claims, 3 Drawing Sheets

COMMUNICATION SYSTEMS

FIELD OF THE INVENTION

The present invention relates to communication systems, and more specifically to the upper layers of the OSI 7-layer communication system, as defined by the relevant ISO/OSI standards (eg ISO 7498 (reference model), ISO 8327 (Session), ISO 8823 (Presentation), and ACSE ISO 8650 (Association Control Service Element)).

BACKGROUND OF THE INVENTION

The various events and processes involved in a digital communication system can be organized or classified into several levels or layers, each layer being more abstract than the layer below. The OSI 7-layer system is the internationally accepted model for such systems; in the OSI model, the processes or events are classified into 7 layers, which can be summarized as follows:

1 Physical
2 Data link
3 Network
4 Transport
5 Session
6 Presentation
7 Application.

A major advantage of this classification into layers is that it enables the specification of protocols to be similarly divided up. In general, layer N−1 provides one or more communication services to layer N. That is, the service provided by layer N is defined in terms of a protocol which uses the services of layer N−1. Layer N in turn provides one or more communication services to layer N +1, and so on.

The Physical layer defines services applicable to a physical link between two (or more) intercommunicating units. The protocol supporting this service is typically defined in terms of electrical signals on wires or optical cables. The Datalink layer builds on the services of the physical layer to provide a service to the Network layer, and so on up through the layers. Each layer provides a different service; for example, the network layer includes protocols to determine the best route through a network, while the transport layer provides a common service over different networks layers.

The design of each layer is thus largely independent of the design of the other layers. In particular, a change in the implementation of a layer requires only relatively minor adjustments to the interface functions with the adjacent layers.

UPPER LAYERS

The 7 layers of OSI fall fairly naturally into two groups: layers 1 to 4, which are termed the lower layers; and layers 5 to 7, which are termed the upper layers. We are here concerned with the upper layers, and we need to consider them in more detail.

In the broadest terms, the lower layers 1 to 4 are concerned with the reliable delivery of blocks of individual information elements called octets (each octet being an 8-bit quantity). The upper layers are concerned with structuring the individual information elements, supplied by the lower layers, for use by applications.

The session layer (layer 5) is concerned broadly with dialogue control between the two intercommunicating units, including such matters as the demarcation of separate messages in the stream of information passing from one unit to the other by inserting minor and major synchronization (sync) points in the stream of data units passing between the units so that the system can recover from failure by rolling back to a sync point. The presentation layer (layer 6) is concerned with such matters as information translation and transmission in common form, the negotiation of syntaxes and representations for information, and formatting matters (character sets, arrays, records, etc). The application layer (layer 7) is concerned with the identification and confirmation of system processing capabilities of the two units (directories, files, terminal access, etc); the application layer may often be involved only at the start and finish of the communication).

Each of the upper layers involves appropriate "handshaking" between the two units to establish the details of the connection between the two units at that level. Hence the general form of each information element passing between the two units—a session service data unit, SSDU—is the data or information itself with three attached protocol control information—PCI—units, one for each layer. The SSDU is received by the session layer (layer 5) from the transport layer, layer 4. This layer strips off and analyses the session PCI, takes the appropriate action, and passes the SSDU on to layer 6. This layer, the presentation layer, strips off and analyses the presentation PCI, takes the appropriate action, and passes the SSDU on to layer 7. This layer, the application layer, strips off and analyses the application PCI, takes the appropriate action, and passes the SSDU (which by now consists of just the data or information itself) on to the user.

This general procedure may of course be specialized in various ways. There is a broad division of the operations into the setting up and termination of a connection, on the one hand, and the transfer of information while the connection is in being, on the other. For setting up and terminating connections, various SSDUs will be exchanged which may consist solely of PCIs without any information elements. In contrast, once a connection has been established, there will normally be a stream of information units to be passed, and the three upper layers need take no significant action beyond passing those information units up to the user. (There may however be various "control" functions occurring during the transfer of information. The sync points are one example, and there are others; eg it may become necessary to negotiate new formats (known as presentation contexts) during the transfer of information.

STATE TABLES

The OSI standards define the details of each of the upper layers in terms of state tables, variables, actions, primitives, and predicates.

The state tables define states and state transitions. In each layer, the system can exist in any of a large number of distinct states; the actual state which the system is in will depend on the history of the system. The history of the system is the sequence of signals which it has received in the past. It receives those signals from two sources; the layer above it (or the user), and the corresponding layer in the system with which it is communicating. (The signals received from the other system are PCIs (also termed primitives). These will in fact, of course, come up through the interface of the layer with the layer below, but those signals will have originated from the corresponding layer of the other system.)

In any particular state of the system, there will be a number of possible transitions to other states. A transition will occur in response to an input signal, and which particular transition occurs will depend on the contents of the input signal. On a transition, the system will in general send out certain messages, to the layer above and to the corresponding layer in the other system. (Of course, a transition can be to the same state, and there may be no message sent out.)

The states and state transitions together form the state table for the layer. The state table thus consists, in abstract terms, of a number of cells arranged in rows and columns. Conventionally, each column represents a state, and each row represents an input signal. Each cell contains an action (the sending out of certain signals) and a transition (the next state to be entered).

The total number of distinguishable situations (or "states", using quotation marks) which the system can have is very large, and many of the situations are largely equivalent for many purposes. To keep the state table to a manageable size, the system therefore also uses variables. A variable may have various forms, eg a binary flag, a multi-valued flag indicating one of a variety of different conditions, or a numerical value. The distinction between variables and states (which is partly a matter of convention) is defined by the OSI standards.

The use of variables means that the actions in the cells of the state table will often include the updating of certain variables. Further, the actions taken (and the next states) may be dependent on the values of certain variables. In general, therefore, a cell in the state table will contain a number of predicates, each of which defines a particular combination of values of certain variables, each predicate being accompanied by a set of actions to be taken and a state transition to be made if the conditions defined by the predicate are satisfied. (Conventionally, the predicates are defined so that one and only one is satisfied.)

Even with the use of predicates, the numbers of states and of signals are both large, and the complete state table will therefore be very large (the number of cells will be the product of the number of states and the number of input signals). In practice, the state table is divided into a set of component state tables, each of which consists of a number of states and a number of input signals which are associated with each other. For the session layer, for example, there will be a component state table for the various states and input signals which are together concerned with token exchange and management, and another for the various states and input signals which are together concerned with sync point management.

There will of course be some overlap of input signals and states between different component state tables; the wait (idle) state, for example, will be included in several component state tables. But if, for some input signal, there is no component state table including the current state, there has clearly been some major fault, and the system automatically aborts.

IMPLEMENTATION

The state tables can be implemented in various ways, but a convenient technique is as follows. There is a number of component state table memories, one for each component state table, each component state table comprising an array of cells which are addressed by row and column. The row addressing is performed by a preliminary look-up on the incoming signal, to identify the appropriate component state table and the row number; the column addressing is directly from a state number register. Each cell contains one or more entries, each entry being the combination of a predicate, one or more actions, and a state change.

Several cells in the state tables may refer to the same variable. There is therefore a separate variable list or table in which the variables themselves are held, and the cells contain references or pointers to the variables. There is a variable updating logic unit which reads and updates the variables in the variable list in accordance with the actions specified in the cells.

It is also convenient to have a separate predicate list or table in which the predicates themselves are stored, with the cells containing references or pointers to the variables. (This simplifies the contents of the cells of the component state tables, and minimizes the duplication which arises when several cells have the same predicate.) The variable list is accessed from the predicate list via a predicate logic unit which in effect parses the predicate obtained from the predicate list and determines whether the condition specified by it is satisfied by the actual values of the variables.

The predicate list may incorporated in the predicate logic unit, which may be in the form of a set of logic circuits, one for each predicate. Each logic circuit is fed from the appropriate variables in the variable list, and performs the appropriate logical operations on those inputs. The predicates are thus defined implicitly by the circuitry of the logic circuits. Each predicate in the component state table selects the appropriate logic circuit, eg by enabling an AND gate at the output of the logic unit. The outputs of all the logic circuits are combined in a final OR circuit.

There is also an entry logic unit which processes the entries in a cell. For each entry, the entry logic unit causes the predicate logic unit to determine whether the predicate of that entry is satisfied. If it is, then the entry logic unit carries out the actions specified in that entry (sending out any signals specified, and causing the variable updating logic unit to carry out any variable updating specified), and finally carries out the state change specified in that entry. If the predicate of the entry is not satisfied, then the entry logic unit proceeds to the next entry in the cell.

The variables of the three layers are largely independent, and may be held in separate lists. However, it may be convenient to use a single list for all variables, with the variables for the different layers being distinguished by different labels. Similarly, it may be convenient to use a single list for all predicates, with the predicates for the different layers (and the different component tables within each layer) being distinguished by different labels.

LAYER AMALGAMATION

The division of the OSI upper layer functions into three layers was made, when the OSI model was being developed, for various reasons, such as the fact that some of these functions can be divided naturally into 3 layers, and partly for clarity and consistency with the layer structure of the lower layers. However, the separation of the functions of the upper layers into three distinct layers is to a considerable extent arbitrary, and the need to achieve such separation has resulted in a considerable amount of duplication of functions (in a broad and general sense) between certain of the OSI upper layers.

This situation has been recognized and discussed. One proposal is that there should be in effect a new single-layer standard for the upper layers. That would also have the advantage that a variety of other defects have also become apparent in the existing standard, and these could be addressed and rectified in the new standard. However, a major difficulty with this approach is compatibility. There is a large installed base of existing systems conforming with the current OSI standard. This needs to be maintained, and many new systems have to be compatible with it and must therefore themselves conform to the existing standards.

The implementation of the three OSI upper layers, by means of the three sets of state tables (with their associated variables and predicates), reflects the duplication of functions between the different layers. This leads to inefficiencies in the implementation of the upper 3 layers. Further, with the use of three separate state tables there is a danger of conflicting (disruptive) events occurring simultaneously in different state tables; proper synchronization of the state tables has to be arranged, to prevent this.

It is therefore desirable to amalgamate the three OSI upper layers into a single system; and the straightforward way of doing this would be to simply amalgamate the three state tables.

The state table for each of the upper three layers is large, consisting of a large number of possible input signals and a large number of possible states. A direct amalgamation of the three tables would require the defining of a distinct combined input signal for every possible combination of input signals to the three layers individually, and a distinct combined state for every possible combination of states of the three layers individually.

On a simple view, this increases both the number of input signals (input signal combinations) and the number of states (state combinations) from $3n$ to $3^n$. In fact, matters are not so serious as this simple view suggests. As was discussed above, even in a single layer, the state table can be divided into a number of component state tables which are largely independent, and the same principles can be applied to the amalgamated or combined state table. Similar principles also apply to the combinations of input signals (each combination being a triplet of input signals, one per layer); in practice, in many cases only one of the three elements of a triplet will be variable and the other two elements will be invariant.

Nevertheless, the complexity resulting from state table amalgamation is daunting. The difficulties are particularly severe in those areas where the functions of say two layers have a general similarity but differ in detail. In such situations, many combinations of the two individual layer states and of the two individual layer input signals will be possible, and the numbers of combined states and signals will be the products of the numbers of individual states and of individual signals.

SUMMARY OF THE INVENTION

The main object of the present invention is to reduce the complexity of the amalgamated state table in this latter situation.

The particular situation addressed in this invention is where there is a set of states in one layer and each of these states corresponds in the same way to a plurality of states in another layer. In this situation, the number of states of the two layers combined is clearly the product of the numbers of states in the two layers individually. (It is assumed that the actions and/or state changes are dependent on the states of both layers, ie that the differences between the states are not trivial for either layer.)

In the present invention, this situation is dealt with by (a) treating the states of one layer as a variable (state variable), and (b) defining a set of predicates (amalgamation predicates) which together represent all relevant combinations of the variable so defined. The number of states of the amalgamated component state table is therefore kept the same as the number of states of one of the three component state tables being amalgamated. Further, if the same actions and state change are required in a cell for two or more values of the state variable, the use of a suitable one of the amalgamation predicates allows a single entry to be used; hence the number of entries in the cells of the resulting component state table is kept to the minimum number required to define the number of distinct actions and state changes required.

According to a first aspect, the present invention provides a digital communication unit operating in accordance with the OSI 7-layer communication model, including a single amalgamated state table into which the 3 OSI upper layer state tables (session, presentation, and application) have been merged and comprising an array of cells in rows and columns, the cells containing entries each of which consists of a predicate actions and next state information; table row look-up means responsive to message PDU's (protocol data units); table column look up means storing the amalgamated state; entry logic means for processing the entries of a selected cell; predicate logic means for processing the predicate of a selected entry; and a variable list containing the variables referred to by the predicates and actions; the variable list including a variable (p-state) which represents the plurality of session layer states associated with a presentation layer service (P-ALTER-CONTEXT); and the predicates including a set of new predicates which detect a variety of possible combinations of states of the variable (p-state).

According to a second aspect, the present invention provides a method of performing the processing required in a digital communication unit operating in accordance with the OSI 7-layer communication model, including using a single amalgamated state table into which the 3 OSI upper layer state tables (session, presentation, and application) have been merged and comprising an array of cells in rows and columns, the cells containing entries each of which consists of a predicate, actions, and next state information; looking up the table row in response to message PDU's (protocol data units); looking up the table column in accordance with the stored amalgamated state; processing the entries of a selected cell; processing the predicate of a selected entry; and maintaining a list of variables containing the variables referred to by the predicates and actions; the list of variables including a variable (p-state) which represents the 4 session layer states associated with the presentation layer P-ALTER-CONTEXT service; and the predicates including a set of new predicates which detect a variety of possible combinations of states of the variable p-state.

BRIEF DESCRIPTION OF THE DRAWINGS

A system embodying the invention will now be described, by way of example, with reference to the drawings, in which.

DESCRIPTION OF THE PREFERRED EMBODIMENT

Figure 1:
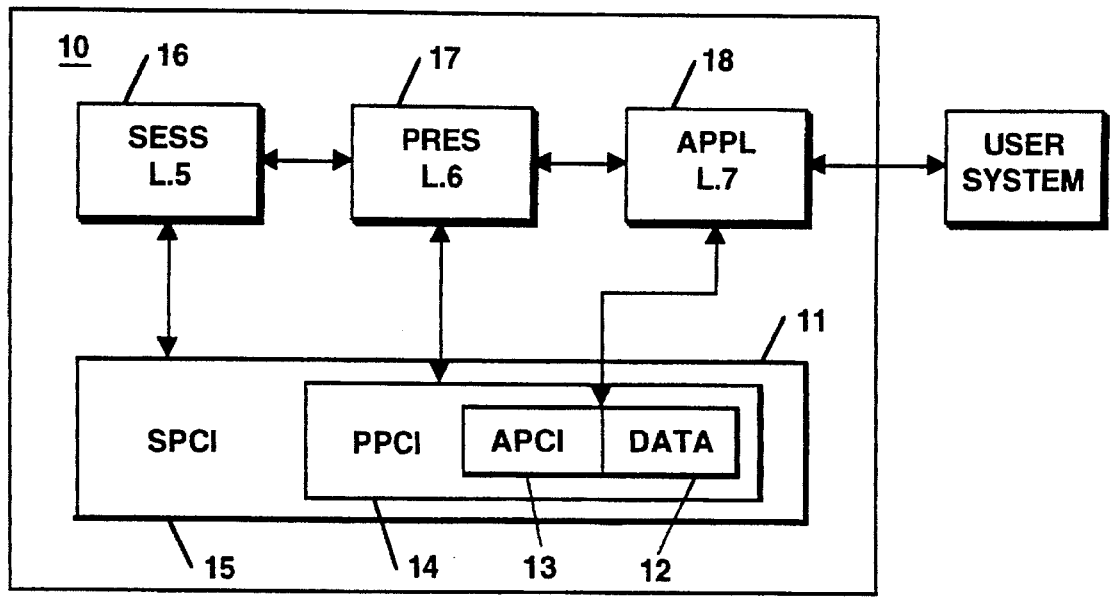
FIG. 1 is a block diagram of a conventional system.

FIG. 1 shows the upper layers of a conventional system 10, which communicates with a message system (not shown) at the left and a user system 19. The system 10 includes a segmented register 11 which is coupled to the communication system, and three level analysis units, a session level analysis unit 16, a presentation level analysis unit 17, and an application level analysis unit 18.

The register 11 is segmented to contain various fields which form PCIs and PDUs. Segment 12 contains a user data field DATA; adjacent to this is segment 13, which contains an application protocol control field APCI 13. These two fields together form an application protocol data unit APDU. Adjacent to field 13 there is a presentation protocol control field PPCI 14; this field, together with the APDU, forms a presentation protocol data unit PPDU. Adjacent to field 14 there is a session protocol control field SPCI; this field, together with the PPDU, forms a session protocol data unit SPDU.

In operation, an incoming message is received by the register 11 from the lower (transport) layers (not shown), the message format being segmented to match the segmenting of the register 11. The session PCI in field 13 is passed to the session level analysis unit 16, which includes a session state register and session state table; unit 16 checks the session PCI and updates its state. The presentation PCI in field 14 is then passed to the presentation level analysis unit 17, which includes a presentation state register and presentation state table; unit 17 checks the presentation PCI and signals received from the session level analysis unit 16 and updates its state. The application PCI in field 15 is then passed to the application level analysis unit 18, which includes an application state register and application state table; unit 18 checks the application PCI and signals received from the presentation level analysis unit 17 and updates its state. The data field in register segment 12 is finally passed to a user system 19 along with signals from the application level analysis unit 18.

For an outgoing message, the various level analysis units 16 to 18 will return fresh PCIs to the register 11, either in response to the PCIs received from that register or in response to signals received from the user system 19 along with a data field, for transmittal as an outgoing message back to another system.

As explained above, in practice the messages fall broadly into two classes, those concerned with initiating and terminating a linkage between the two systems and those concerned with passing data between the two systems.

Figure 2:
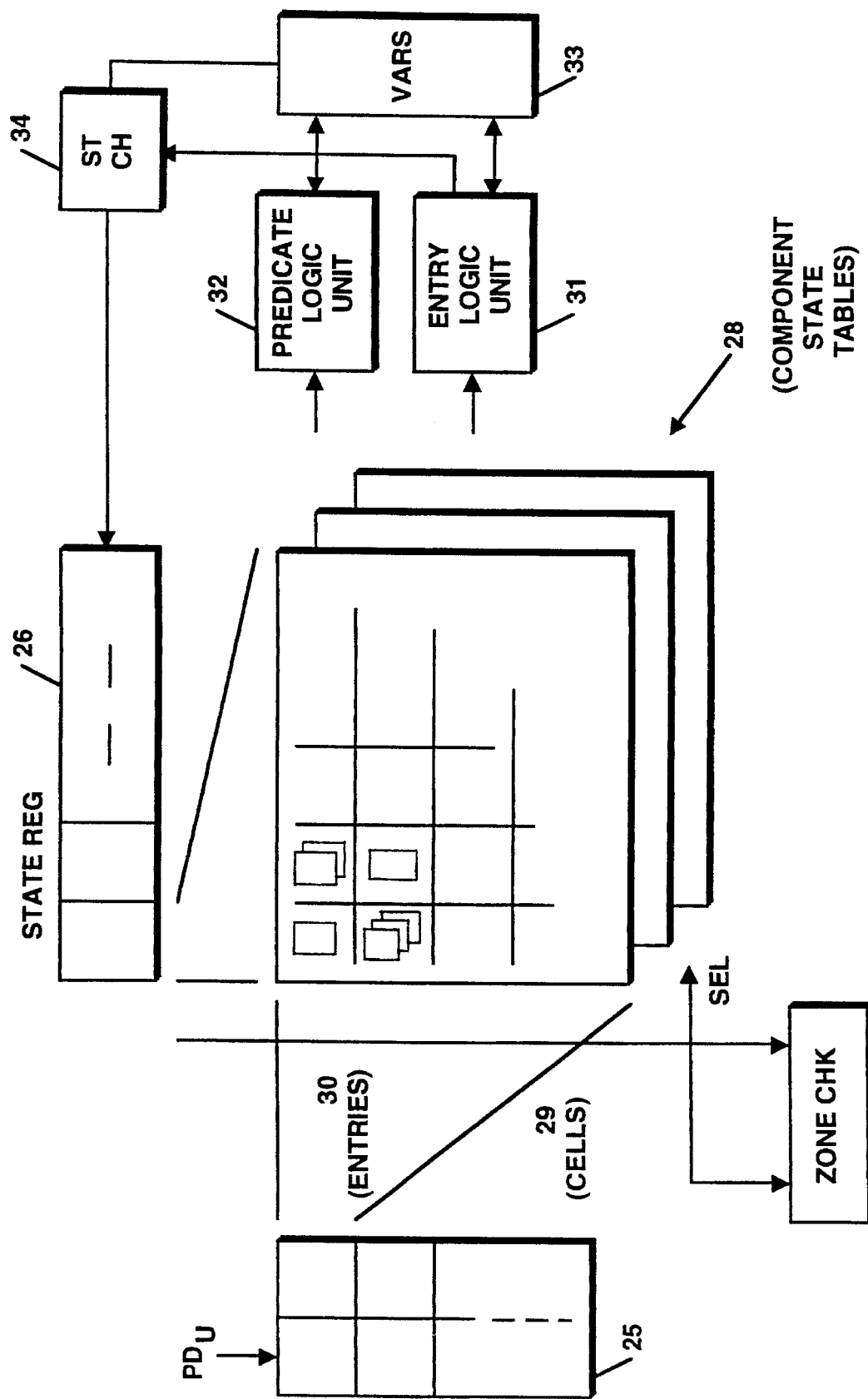
FIG. 2 is a block diagram of a level analysis unit of the system of FIG. 1.

FIG. 2 is a block diagram of one of the level analysis units 16 to 18. The incoming PCI is passed to a PCI look-up table 25, which checks that the both the PCI structure and all the fields in the PCI are valid. The PCIs can be classified into various groups, each of which has an associated component state table, and the table 25 selects a corresponding one of a set of component state tables 28.

A state register 26, which contains the state of the level analysis unit. Once the component state table has been selected, the PCI and the state from the state register 26 are used to select a cell in the selected component state table. Each state table consists of a set of cells 29 arranged in rows and columns. The row is selected by the PCI (via the look-up table 25), and the column by the state (from state register 26). Each cell contains one or more entries 30. There is also an entry logic unit 31, a predicate logic unit 32, and a variable list 33 associated with the component state tables 28, and a state register updating unit 34.

The states can be classified into various groups corresponding to the groups into which the PCIs are classified, and each of the component state tables represents a pair of such groups. A check circuit 27 may be provided to detect when the state in the state table is incompatible with the PCI, ie when there is no component state table for the combination of the PCI and the state, and to thereupon issue an abort signal.

Figure 3:
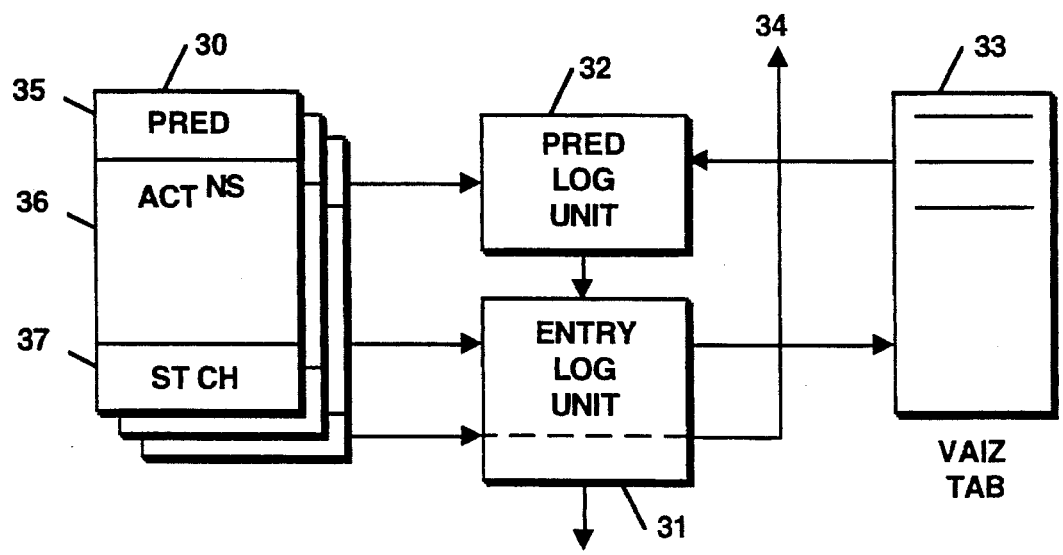
FIG. 3 is a more detailed block diagram of part of FIG. 2.

FIG. 3 shows the relationship between the entries 30, the entry logic unit 31, the predicate logic unit 32, and the variable list 33 in more detail. Each entry in a cell consists of a predicate field 35, an actions field 36, and a state change field 37. The entry logic unit 31 selects each of the entries in turn. When an entry is selected, the predicate in its predicate field is passed to the predicate logic unit 32, which parses (analyses) the predicate and determines whether that predicate is satisfied, inspecting the values of the variables in the variable list 33 for the purpose. If the predicate is not satisfied, then the entry logic unit selects the next entry 30. If none of the predicates is satisfied, there is a protocol violation and an abort is sent.

Once the entry in the cell has been found whose predicate is satisfied, the actions in the actions field 36 are then passed to the entry logic unit 31, which performs them (in sequence). The actions may include generating signals to be passed to other level analysis units, the register 11, and/or the user system 19. The actions may also include updating one or more of the variables stored in the variable list 33. Finally, the contents of the state change field 37 are forwarded by the entry logic unit 31 to the state change logic 34 to update the state of the state register 26.

The three level analysis units 16 to 18 require separate state registers and component state tables. However, since they operate in sequence, there be a common PCI look-up table, entry logic unit, predicate logic unit, variable list shared by all three level analysis units (though each individual variable will normally be used by only one level).

Figure 4:
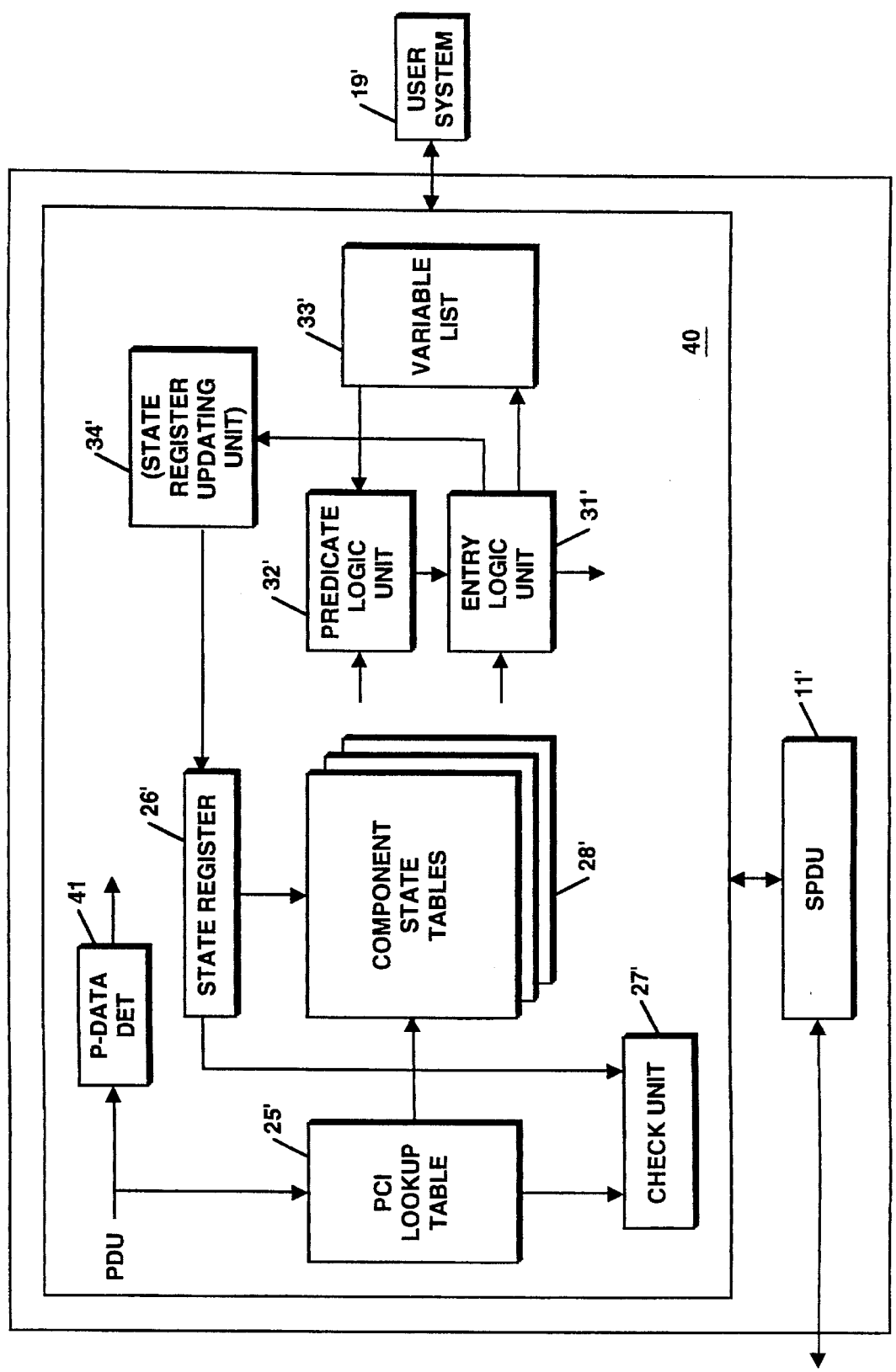
FIG. 4 is a block diagram of the present system.

FIG. 4 is a corresponding block diagram for the present system. It will be seen that this includes a level analysis unit similar to that shown in FIG. 2, and corresponding units are referenced to match (with primes added). However, in the present system, there is only a single combined level analysis unit 40, and hence only a single state register 26'. There is, as before, a common PCI look-up table 25', entry logic unit 31', predicate logic unit 32', and variable list 33'.

The PCI signals fed to the PCI table 25' can be the combined PCIs of all three segments 13 to 15 of the register 11. However, in general it is preferred to use only the upper layer PCI, ignoring the lower layer PCIs. This helps to reduce the complexity of the system. We have also found that as a result of amalgamating the state tables, it is possible to eliminate some variables, such as the presentation variable aep.

The system also includes a P-DATA detector 41, which is active in normal data transfer mode and detects the PCI used to transfer data to or from the user system. If this header is detected, the data field is passed directly to or from the user system, so that the PCI processing by the level analysis unit 40 is bypassed and the passage of user data thus speeded up.

In combining the state tables for the three upper layers, there is a situation where the combination requires a quadrupling of the number of states. This situation arises in combining the data phase services of the session and presentation layers. The presentation layer has a service called P-ALTER-CONTEXT. The protocol which supports this service requires 4 states for each of the supporting session states. The presentation states are listed and described in Table I.

TABLE I

| | |
|---|---|
| initial | state while connection is being established |
| awaitACA | awaiting confirmation of a P-ALTER-CONTEXT request |
| awaitP-ALTERrsp | awaiting local response to a P-ALTER-CONTEXT request |
| awaitP-ALTERrsp_or_ACA | awaiting either a local response to a P-ALTER-CONTEXT request or a remote confirmation |
| data-transfer | normal data transfer. |

If the state tables are amalgamated in a straightforward way, the existence of these 4 presentation layer states for each of the corresponding session layer states involves a quadrupling of the number of states in the amalgamated state table. In the present system, this quadrupling of the number of amalgamated states is avoided by designating a new variable, p-state, which can take any one of 5 values, as given in Table II.

TABLE II

| | | |
|---|---|---|
| variable:p10000 | initial | state while connection is being established |
| variable:p01000 | awaitACA | await confirmation PDU for P-ALTER-CONTEXT |
| variable:p00100 | awaitP-ALTERrsp | await the P-ALTER-CONTEXT response service |
| variable:p00010 | awaitP-ALTERrsp_or_ACA | await either confirmation PDU for P-ALTER-CONTEXT or the P-ALTER-CONTEXT response service |
| variable:p00001 | data-transfer | normal data transfer mode. |

In this table, the possible states of the variable are given as a convenient 5-bit coding.

Associated with this new variable, there are 5 new actions, as given in Table III.

TABLE III

| | |
|---|---|
| action:p0000 | set p-state to 10000 (initial) |
| action:p1000 | set p-state to 01000 (awaitACA) |
| action:p0100 | set p-state to 00100 (awaitP-ALTERrsp) |
| action:p0010 | set p-state to 00010 (awaitP-ALTERrsp_or_ACA) |
| action:p0001 | set p-state to 00001 (data-transfer) |

Any of these actions may appear in any of the entries in the component state tables, as required.

Also associated with this new variable, there are 15 new predicates (amalgamated predicates), as given in Table IV.

TABLE IV

| | | |
|---|---|---|
| pred:p0000 | 00000 | initial state |
| pred:p1000 | 01000 | await ACA state |
| pred:p0100 | 00100 | await P-ALTERrsp state |
| pred:p0010 | 00010 | await ACA or P-ALTERrsp state |
| pred:p0001 | 00001 | data-transfer state |

TABLE IV-continued

| | | |
|---|---|---|
| pred:p1001 | 01001 | await ACA or data-transfer state |
| pred:p1010 | 01010 | await ACA or await ACA and P-ALTERrsp state |
| pred:p1100 | 01100 | await ACA or P-ALTERrsp state |
| pred:p0110 | 00110 | await P-ALTERrsp or await ACA and P-ALTERrsp state |
| pred:p0011 | 00011 | await ACA and P-ALTERrsp or data-transfer state |
| pred:p0101 | 00101 | await ACA state |
| pred:p1110 | 01110 | any state except data transfer |
| pred:p1101 | 01101 | ant state except P-ALTERrsp or await ACA |
| pred:p1011 | 01011 | any state except await P-ALTERrsp |
| pred:p0111 | 00111 | any state except await ACA |

In this table, the first column lists the names of the predicates (as they appear in the entries in the state table) and the final column indicates the conditions which they detect. The first predicate detects the initial state of the variable p-state, while the remaining predicates detect various combinations of the other possible states of this variable. (The combinations listed are those which are required by the amalgamated component state table; thus the predicate pred:p 1111 and the condition "any state except the initial state", for example, are not included, as it so happens that this predicate is not required in the component state table.)

The second column in the table indicates a convenient coding for the predicate logic unit 32'. Thus the coding 01100, for example, indicates a predicate which is true if the variable p-state represents either of the states awaitACA and awaitP-ALTERrsp, which are coded as 01000 and 00100 respectively.

Using the coding given in Table II for the variable p-state, these predicates can be implemented by a bit-wise ANDing followed by ORing of the coding for the variable and the predicates. If the result of the bitwise ANDing is 00000, the predicate is not satisfied; if the result is anything else (ie contains any 1, as detected by the ORing), the predicate is satisfied.

We claim:

1. A digital communication unit operating in accordance with an Open Systems Interconnection (OSI) 7-layer communication model, including:

a single amalgamated state table into which three OSI upper layer state tables have been merged and comprising an array of cells in rows and columns, the cells containing entries each of which consists of a predicate actions and next state information;

table row look-up means responsive to message protocol data units (PDU's);

table column look up means storing an amalgamated state;

entry logic means for processing the entries of a selected one of the array of cells;

predicate logic means for processing the predicate of a selected entry; and a variable list containing the variables referred to by predicates and actions;

the variable list including a variable which represents a plurality of session layer states associated with a presentation layer service; and the predicates including a set of new predicates which detect a variety of possible combinations of states of the variable which represents the plurality of session layer states associated with the presentation dervice.

2. A digital communication unit according to claim 1 wherein the variable which represents the plurality of session layer states associated with the presentation dervice is a p-state variable, and the presentation layer service is a P-ALTER-CONTEXT service having four session layer states associated therewith, and wherein the p-state variable is represented by a 5-bit combination in which one bit position represents an initial state and another 4 bit positions represent respective ones of the 4 states of the presentation layer P-ALTER-CONTEXT service, and each predicate associated with the variable p-state is represented by a corresponding 5-bit combination in which each bit position represents a state of the variable p-state for which that predicate is true.

3. A digital communication unit according to claim 2, wherein the predicate logic means includes means for processing the predicates associated with the p-state variable comprising bit-wise AND means fed with the 5-bit combinations for the variable and the predicate and feeding by OR means.

4. A method of performing the processing required in a digital communication unit operating in accordance with an Open Systems Interconnection (OSI) 7-layer communication model, including:

using a single amalgamated state table into which three OSI upper layer state tables have been merged and comprising an array of cells in rows and columns, the cells containing entries each of which consists of a predicate, actions, and next state information;

looking up the table row in response to message protocol data units (PDU's);

looking up the table column in accordance with a stored amalgamated state;

processing the entries of a selected one of the array of cells;

processing the predicate of a selected entry; and maintaining a list of variables containing the variables referred to by predicates and actions;

the list of variables including a p-state variable which represents the 4 session layer states associated with a presentation layer P-ALTER-CONTEXT service; and the predicates including a set of new predicates which detect a variety of possible combinations of states of the p-state variable.

5. A method according to claim 4 including representing the p-state variable by a 5-bit combination in which one bit position represents an initial state and another 4 bit positions represent respective ones of the 4 states of the presentation layer P-ALTER-CONTEXT service, and representing each predicate associated with the variable p-state by a corresponding 5-bit combination in which each bit position represents a state of the variable p-state for which that predicate is true.

6. A method according to claim 5 including processing the predicates associated with the p-state variable by bit-wise ANDing followed by ORING of a coded variable and a predicate.

* * * * *